(12) United States Patent
Gilstrap et al.

(10) Patent No.: US 7,137,020 B2
(45) Date of Patent: Nov. 14, 2006

(54) METHOD AND APPARATUS FOR DISABLING DEFECTIVE COMPONENTS IN A COMPUTER SYSTEM

(75) Inventors: Raymond J. Gilstrap, Milpitas, CA (US); Daniel J. Hain, Poway, CA (US); Fongyan Gang, San Diego, CA (US); David S. Gordon, Farnborough (GB)

(73) Assignee: Sun Microsystems, Inc., Santa Clara, CA (US)

( * ) Notice: Subject to any disclaimer, the term of this patent is extended or adjusted under 35 U.S.C. 154(b) by 536 days.

(21) Appl. No.: 10/412,998

(22) Filed: Apr. 14, 2003

(65) Prior Publication Data

US 2003/0217256 A1 Nov. 20, 2003

Related U.S. Application Data

(60) Provisional application No. 60/381,400, filed on May 17, 2002, provisional application No. 60/381,129, filed on May 17, 2002.

(51) Int. Cl.
*G06F 1/26* (2006.01)
*G06F 1/28* (2006.01)
*G06F 1/30* (2006.01)
*G06F 11/07* (2006.01)
*G06F 11/14* (2006.01)

(52) U.S. Cl. .................. 713/324; 713/300; 713/322; 713/323; 714/7; 714/11; 714/16; 714/23

(58) Field of Classification Search ............... None
See application file for complete search history.

(56) References Cited

U.S. PATENT DOCUMENTS

| 5,068,851 A | 11/1991 | Bruckert et al. |
| 5,253,184 A | 10/1993 | Kleinschnitz |
| 5,293,556 A * | 3/1994 | Hill et al. ............... 714/26 |
| 5,404,503 A | 4/1995 | Hill et al. |
| 5,530,946 A * | 6/1996 | Bouvier et al. ......... 714/23 |
| 5,552,999 A | 9/1996 | Polgreen et al. |
| 5,761,413 A * | 6/1998 | Frank et al. ............ 714/49 |
| 5,784,624 A | 7/1998 | Douglass et al. |
| 5,794,065 A | 8/1998 | Hatakeyama et al. |
| 5,867,809 A | 2/1999 | Soga et al. |
| 5,961,215 A | 10/1999 | Lee et al. |
| 6,016,758 A | 1/2000 | Tomita |

(Continued)

FOREIGN PATENT DOCUMENTS

EP 623 900 11/1994

(Continued)

OTHER PUBLICATIONS

Hewlett Packard, White Paper, "IPMI: Intelligent Platform Management Interface," Feb. 1998, 5 pages.

(Continued)

*Primary Examiner*—James K. Trujillo
(74) *Attorney, Agent, or Firm*—Lawrence J. Merkel; Meyertons, Hood, Kivlin, Kowert & Goetzel, P.C.

(57) ABSTRACT

A method for configuring a computer system includes identifying a defective component in the computer system; disabling at least the defective component; and dynamically reconfiguring the computer system to allow continued operation with the defective component disabled. A computer system includes a plurality of components and a system controller. The system controller is adapted to identify a defective component from the plurality of components, disable at least the defective component, and dynamically reconfigure the computer system to allow continued operation with the defective component disabled.

10 Claims, 5 Drawing Sheets

U.S. PATENT DOCUMENTS

| | | | |
|---|---|---|---|
| 6,058,052 A * | 5/2000 | Steadman | 365/200 |
| 6,070,253 A * | 5/2000 | Tavallaei et al. | 714/31 |
| 6,154,728 A | 11/2000 | Sattar et al. | |
| 6,198,245 B1 | 3/2001 | Du et al. | |
| 6,249,838 B1 | 6/2001 | Kon | |
| 6,289,735 B1 | 9/2001 | Dister et al. | |
| 6,308,289 B1 | 10/2001 | Ahrens et al. | |
| 6,349,268 B1 | 2/2002 | Ketonen et al. | |
| 6,415,395 B1 | 7/2002 | Varma et al. | |
| 6,425,055 B1 | 7/2002 | Sager et al. | |
| 6,519,552 B1 | 2/2003 | Sampath et al. | |
| 6,658,586 B1 | 12/2003 | Levi | |
| 6,684,180 B1 | 1/2004 | Edwards et al. | |
| 6,708,297 B1 * | 3/2004 | Bassel | 714/47 |
| 6,738,748 B1 | 5/2004 | Wetzer | |
| 6,742,145 B1 * | 5/2004 | Bailey et al. | 714/42 |
| 6,789,214 B1 * | 9/2004 | De Bonis-Hamelin et al. | 714/15 |
| 6,892,159 B1 | 5/2005 | Weiss et al. | |
| 6,920,519 B1 * | 7/2005 | Beukema et al. | 710/306 |
| 2002/0007468 A1 * | 1/2002 | Kampe et al. | 714/4 |
| 2002/0169871 A1 | 11/2002 | Cravo de Almeida et al. | |
| 2003/0167273 A1 | 9/2003 | Alexander et al. | |

FOREIGN PATENT DOCUMENTS

| | | |
|---|---|---|
| WO | 03/014752 | 2/2003 |

OTHER PUBLICATIONS

Intel, Hewlett-Packard, NEC, Dell, "-IPMI- Platrform Event Trap Format Specification," v1.0, Revision 1.0, Dec. 7, 1998, 17 pages.

Intel, Hewlett-Packard, NEC, Dell, "-IPMI- IPMB v1.0 Address Allocation," Revision 1.0, Sep. 16, 1998, 5 pages.

Intel, Hewlett-Packard, NEC, Dell, "-IPMI- Platrform Management FRU Information Storage Definition," v1.0, Revision 1.1, Sep. 27, 1999, 27 pages.

Atmel Corporation, "2-Wire Serial EEPROM," Rev. 03361-SEEPR-07/02, 19 pages.

Atmel Corporation, "Interfacing 24CXX Serial EEPROMs," Rev. 0507D-05/01, 3 pages.

Atmel Corporation, "Atmel's Serial EEPROMs, Solutions for all your design needs," Jan. 1999, 7 pages.

IDEAS International Pty., Ltd., "Sun-ft-SPARC," Competitive Profiles, Jan. 27, 1999, 2 pages.

Sun Microsystems, Inc., "Netra ft 1800 Module EEPROM v.4 Data File Specifications," 1998, 56 pages.

Sun Microsystems, Inc., "Netra ft 1800 Module EEPROM v.4 Data File Specifications, Repair and Reference Fields," 1998, 32 pages.

Sun Microsystems, Inc., "Netra ft 1800 Module EEPROM v.4 Data File Specifications, RMM-Specific Data," 1998, 4 pages.

Sun Microsystems, Inc., "Netra ft 1800 Module EEPROM v.4 Data File Specifications, PCI Card-Specific Data," 1998, 4 pages.

Sun Microsystems, Inc., "Netra ft 1800 Module EEPROM v.4 Data File Specifications, Disk Chassis-Specific Data," 1998, 4 pages.

Sun Microsystems, Inc., "Netra ft 1800 Module EEPROM v.4 Data File Specifications, Motherboard-Specific Data," 1998, 6 pages.

Sun Microsystems, Inc., "Netra ft 1800 Module EEPROM v.4 Data File Specifications, CPUset-Specific Data," 1998, 9 pages.

Sun Microsystems, Inc., "Netra ft 1800 Module EEPROM v.4 Data File Specifications, Generic Data-All Modules," 1998, 20 pages.

"eeprom—display or alter information in a hardware module's eeprom," facsimile received on Jan. 31, 2003, printed on May 19, 1993. 2 pages.

JP2002250578, Abstract, "Refrigerating Container," Sep. 6, 2002, 5 pages.

William K. Hogan, et al., "SMT Connectors for Removable Small-Form-Factor Transceiver Modules," 2000 Electronic Components and Technology Conference, IEEE, pp. 1164-1172.

Lisa Spainhower, et al., Design for Fault-Tolerant in System ES/9000 Model 900, 1992 IEEE, pp. 38-47.

P.L. Hunter, et al., "Fault Tolerant, Hot-Pluggable Power System Design," 1994 IEEE, pp. 815-822.

"ON-Field Replaceable Unit Identification and Error Storage," IBM Technical Disclosure Bulletin, Sep. 1, 1994, vol. 37, Issue 9, 3 pages.

"Data Mining 101," aboutAI.net, Aug. 6, 2000, 3 pages.

Microsoft Computer Dictionary, Copyright 2002, Microsoft Press, Fifth Edition, p. 575.

Perl for System Administration by David Blank-Edelman, Published by O'Reilly 2000, ISBN:1565926099.

Engineering Statistics Handboo, http://www.itl.nist.gov/div898/handbook/apr/section2/apr234.htm, Oct. 29, 2000 version found via the Way Back Machine.

Engineering Documentation Control Handbook (2$^{nd}$ Edition) by F.B. Watts, Published by William Andrew Publishing/Noyes 2000, ISBN:0-8155-1446-8.

Nebraska Dept. of Education General Glossary, http://www.nde/state/ne/us/READ/FRAMEWORK/glossary/general_p-t.html, Jan. 29, 2002 version found via the Way Back Machine.

* cited by examiner

METHOD AND APPARATUS FOR DISABLING DEFECTIVE COMPONENTS IN A COMPUTER SYSTEM

This patent application claims benefit or priority to U.S. Provisional Patent Application Ser. No. 60/381,129, filed on May 17, 2002. This patent application claims benefit or priority to U.S. Provisional Patent Application Ser. No. 60/381,400, filed on May 17, 2002. The above applications are incorporated herein by reference in their entireties.

BACKGROUND OF THE INVENTION

1. Field of the Invention

This invention relates generally to a processor-based computer system, and, more particularly, to a method and apparatus for disabling defective components in a computer system.

2. Description of the Related Art

The last several years have witnessed an increased demand for network computing, partly due to the emergence of the Internet. Some of the notable trends in the industry include a boom in the growth of Applications Service Providers (ASPs) that provide applications to businesses over networks and enterprises that use the Internet to distribute product data to customers, take orders, and enhance communications with employees.

Businesses typically rely on network computing to maintain a competitive advantage over other businesses. As such, developers, when designing processor-based systems for use in network-centric environments, may take several factors into consideration to meet the expectation of the customers, factors such as the functionality, reliability, scalability, and performance of such systems.

One example of a processor-based system used in a network-centric environment is a mid-frame server system. Typically, mid-frame servers are employed in high bandwidth systems requiring high availability factors. Minimizing system downtime is an important system management goal, as downtime generally equates to significant lost revenue. Unlike current desktop computer systems, in which the internal cards and devices are essentially disposable (i.e., they are replaced if they fail, and the defective part is discarded without repair), the individual components used to construct higher end systems, such as the mid-frame server described above, are typically returned to the manufacturer or a third-party vendor associated with the manufacturer for repair. Repaired units are then reinstalled in the same or in a different mid-frame server. These units are commonly referred to as field replaceable units (FRUs). In the service life of a particular FRU, it may be installed in multiple servers owned by different customers. Exemplary units that may be field replaceable, are system control boards, processing boards, memory modules installed on one of the processing boards, input/output (I/O) boards, power supplies, cooling fans, and the like.

Mid-frame servers are employed in high availability, high utilization applications. Typically, such computer systems are provided with replaceable components or modules that may be removed and/or installed without shutting down the system. This on-line replacement capability is commonly referred to as hot-pluggable or hot-swappable environment. In a hot plug scenario, an entire board must be replaced, even if only one component on the board is defective. For example, a processing board typically includes a plurality of processors and associated components. If one of the components fails for one of the processors, effectively, all of the processors are replaced, because the entire board must be replaced.

SUMMARY OF THE INVENTION

One aspect of the present invention is seen in a method for configuring a computer system. The method includes identifying a defective component in the computer system; disabling at least the defective component; and dynamically reconfiguring the computer system to allow continued operation with the defective component disabled.

Another aspect of the present invention is seen in a computer system including a plurality of components and a system controller. The system controller is adapted to identify a defective component from the plurality of components, disable at least the defective component, and dynamically reconfigure the computer system to allow continued operation with the defective component disabled.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, and/or magnetic signals capable of being stored, transferred, combined, compared, and otherwise manipulated. It has proven convenient at times, principally for reasons of common usage, to refer to these signals as bits, values, elements, symbols, characters, terms, numbers, and the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" and the like, refer to the action and processes of a computer system, or similar electronic computing device, that manipulates and transforms data represented as physical, electronic quantities within the computer system's registers and/or memories into other data similarly represented as physical quantities within the computer system memories and/or registers and/or other such information storage, transmission and/or display devices.

The programming instructions necessary to implement these software functions may be resident on various storage devices. Such storage devices referred to in this discussion may include one or more machine-readable storage media for storing data and/or instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, and/or modules in the various systems may be stored in respective storage devices. The instructions when executed by a respective control unit cause the corresponding system to perform programmed acts as described.

Figure 1:
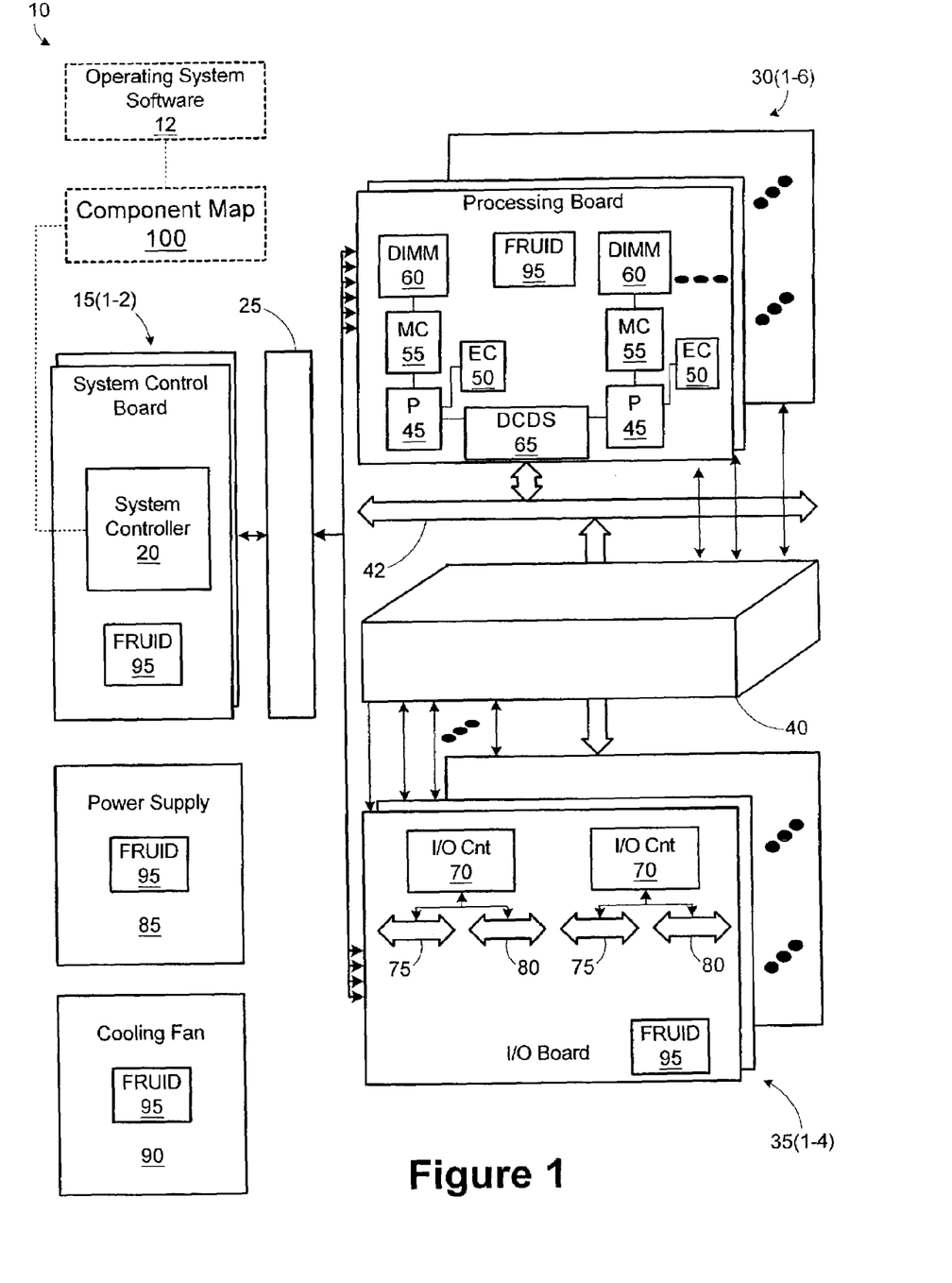
FIG. 1 is a simplified block diagram of a system in accordance with one embodiment of the present invention.

Referring now to FIG. 1, a block diagram of a system 10 in accordance with one embodiment of the present invention is illustrated. In the illustrated embodiment, the system 10 is adapted to run under an operating system 12, such as the Solaris™ operating system offered by Sun Microsystems, Inc. of Palo Alto, Calif.

The system 10, in one embodiment, includes a plurality of system control boards 15(1–2), each including a system controller 20, coupled to a console bus interconnect 25. The system controller 20 may include its own microprocessor and memory resources. The system 10 also includes a plurality of processing boards 30(1–6) and input/output (I/O) boards 35(1–4). The processing boards 30(1–6) and I/O boards 35(1–4) are coupled to a data interconnect 40 and a shared address bus 42. The processing boards 30(1–6) and I/O boards 35(1–4) also interface with the console bus interconnect 25 to allow the system controller 20 access to the processing boards 30(1–6) and I/O boards 35(1–4) without having to rely on the integrity of the primary data interconnect 40 and the shared address bus 42. This alternative connection allows the system controller 20 to operate even when there is a fault preventing main operations from continuing.

In the illustrated embodiment, the system 10 is capable of supporting six processing boards 30(1–6) and four I/O boards 35(1–4). However, the invention is not limited to such an individual implementation, as any number of such resources may be provided. Also, the invention is not limited to the particular architecture of the system 10.

For illustrative purposes, lines are utilized to show various system interconnections, although it should be appreciated that, in other embodiments, the boards 15(1–2), 30(1–6), 35(1–4) may be coupled in any of a variety of ways, including by edge connectors, cables, and/or other available interfaces.

In the illustrated embodiment, the system 10 includes two control boards 15(1–2), one for managing the overall operation of the system 10 and the other for providing redundancy and automatic failover in the event that the other board 15(1–2) fails. Although not so limited, in the illustrated embodiment, the first system control board 15(1) serves as a "main" system control board, while the second system control board 15(2) serves as an alternate hot-swap replaceable system control board.

The main system control board 15(1) is generally responsible for providing system controller resources for the system 10. If failures of the hardware and/or software occur on the main system control board 15(1) or failures on any hardware control path from the main system control board 15(1) to other system devices occur, system controller failover software automatically triggers a failover to the alternative control board 15(2). The alternative system control board 15(2) assumes the role of the main system control board 15(1) and takes over the main system controller responsibilities. To accomplish the transition from the main system control board 15(1) to the alternative system control board 15(2), it may be desirable to replicate the system controller data, configuration, and/or log files on both of the system control boards 15(1–2). During any given moment, generally one of the two system control boards 15(1–2) actively controls the overall operations of the system 10. Accordingly, the term "active system control board," as utilized hereinafter, may refer to either one of the system control boards 15(1–2), depending on the board that is managing the operations of the system 10 at that moment.

For ease of illustration, the data interconnect 40 is illustrated as a simple bus-like interconnect. However, in an actual implementation the data interconnect 40 is a point-to-point switched interconnect with two levels of repeaters or switches. The first level of repeaters is on the various boards 30(1–6) and 35(1–4), and the second level of repeaters is resident on a centerplane (not shown). The data interconnect 40 is capable of such complex functions as dividing the system into completely isolated partitions, and dividing the system into logically isolated domains, allowing hot-plug and unplug of individual boards.

In the illustrated embodiment, each processing board 30(1–6) may include up to four processors 45. Each processor 45 has an associated e-cache 50, memory controller 55 and up to eight dual in-line memory modules (DIMMs) 60. Dual CPU data switches (DCDS) 65 are provided for interfacing the processors 45 with the data interconnect 40. Each pair of processors 45 (i.e., two pairs on each processing board 30(1–6)) share a DCDS 65. Also, in the illustrated embodiment, each I/O board 35(1–4) has two I/O controllers 70, each with one associated 66-MHz peripheral component interface (PCI) bus 75 and one 33-MHz PCI bus 80. The I/O boards 35(1–4) may manage I/O cards, such as peripheral component interface cards and optical cards, that are installed in the system 10.

In the illustrated embodiment, the processors 45 may be UltraSPARCIII™ processors also offered by Sun Microsystems, Inc. The processors are symmetric shared-memory multiprocessors implementing the UltraSPARC III protocol. Of course, other processor brands and operating systems 12 may be employed.

Selected modules in the system 10 are designated as field replaceable units (FRUs) and are equipped with FRU identification memories (FRUID) 95. Exemplary FRUs so equipped may include the system controller boards 15(1–2), the processing boards 30(1–6), and the I/O boards 35(1–4). The system 10 may also include other units, such as a power supply 85 (interconnections with other devices not shown), a cooling fan 90, and the like, equipped with FRUIDs 95, depending on the particular embodiment.

Figure 2:
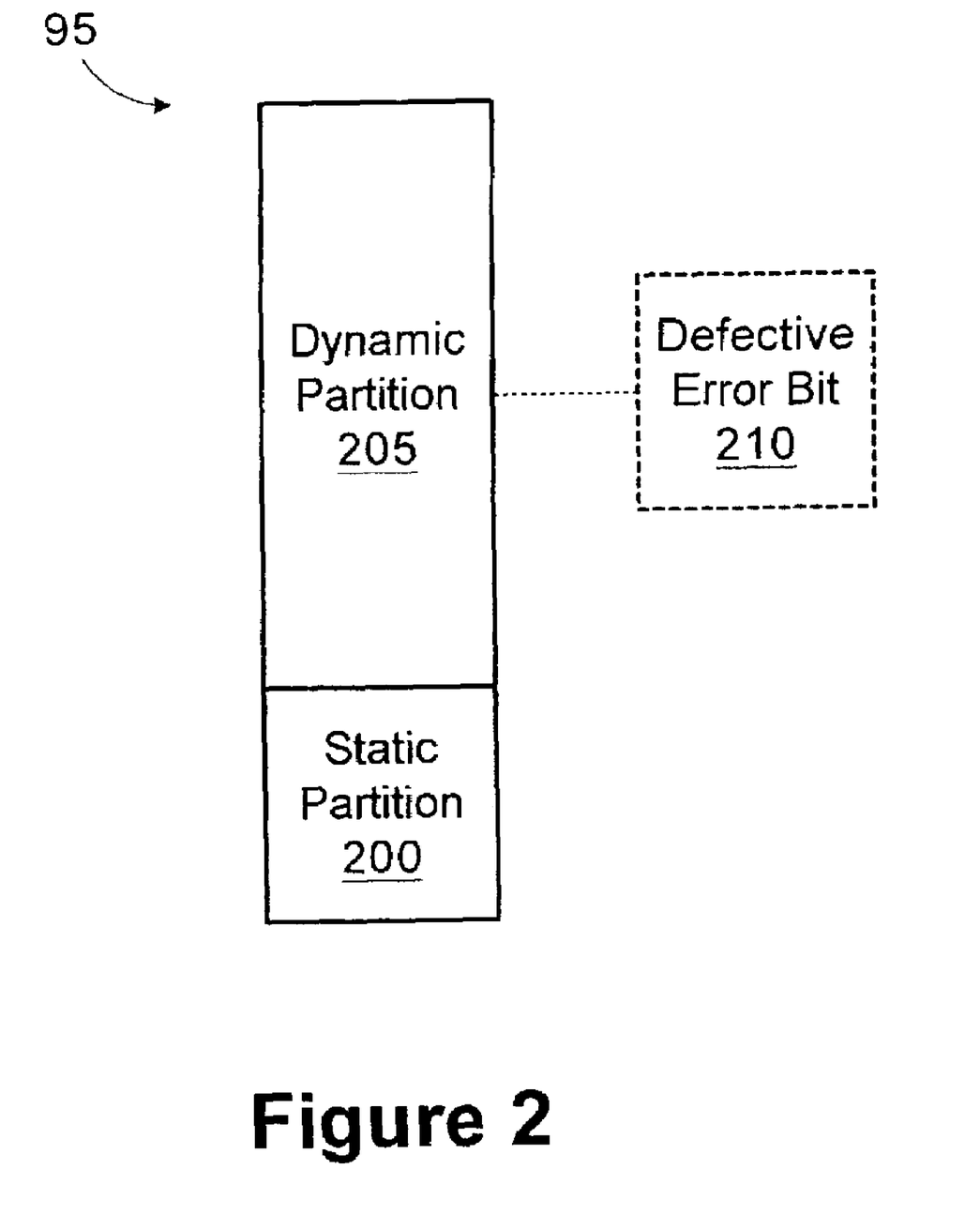
FIG. 2 is a diagram of a field replaceable unit identification memory (FRUID)

Turning now to FIG. 2, a simplified diagram of the FRUID 95 is provided. In the illustrated embodiment, the FRUID 95 is a serial electrically erasable programmable read only memory (SEEPROM) and has an 8 Kbyte space to store information about the associated FRU. Of course other memory types and storage sizes may be used depending on the particular implementation. The FRUID 95 includes a 2Kbyte static partition 200 dedicated to store "static" information and a 6Kbyte dynamic partition 205 to store "dynamic" information.

The static information includes:

Manufacturing Data, such as part number, serial number, date of manufacture, and vendor name;

System ID Data, such as Ethernet address and system serial number; and

System Parameters (e.g., maximum speed, DIMM speed, and maximum power, and the like).

The dynamic information includes:

Operational History Data, such as hours of operation, number of power ons, temperature log;

System configuration data, such as slot number and FRU hierarchy;

Physical Location Data, such as location of data center, latitude, longitude, and altitude;

Field Repair Data; and

Symptom and Diagnosis Data captured on a fault occurrence.

The particular format for storing data in the FRUID 95 is described in greater detail in U.S. Provisional Patent Application Ser. No. 60/381,400, incorporated above.

Some of the benefits derived from the information stored in the FRUID 95 are:

Fatal Error Identification—a fatal error bit may be set on FRU failure and will remain set until after the FRU has been repaired and reset by the repair depot to prevent "accidental" reuse of the failed FRU;

Ease of Tracking Errors—in the event the FRU has been "repaired" and returned to the field, and failed again subsequently with the same or similar failure, the failure log is tagged to insure special attention will be given to the failed FRU;

Trend Analysis—quick identification of certain batch of FRUs with known defects can be done by a serial number embedded into the SEEPROM;

Trend Analysis—quick analysis can be performed by collecting information of specific FRUs, including power-on hours, temperature logs, and the like;

Trend Analysis—quick identification of components from specific vendors on pre-mature failures of certain FRUs; and Field Change Orders can be applied easily with patches after identifying the range of affected FRU by serial numbers.

The system 10 is adapted to store a component map 100 (see FIG. 1) of the components in the system 10. The component map 100 details the submodules associated with the associated FRUs, and includes enable bits for selected FRUs and submodules to allow enabling and/or disabling of the FRUs or submodules for various purposes. The component map 100 may be accessed under direction from a user or a software application to assert or de-assert the enable bits for a particular submodule.

Figure 3:
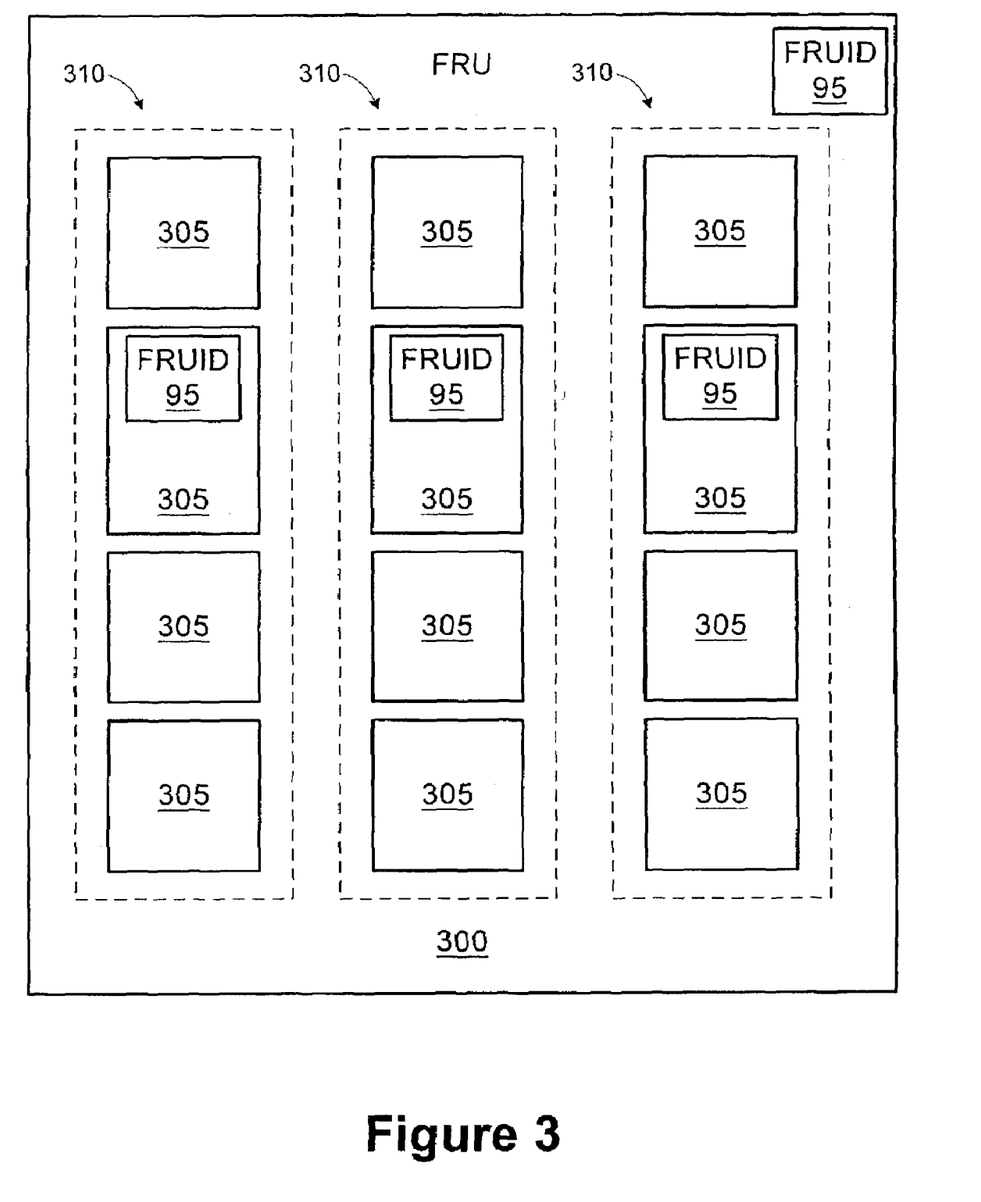
FIG. 3 is a simplified block diagram illustrating a field replaceable unit (FRU) having a plurality of submodules.

Referring now to FIG. 3, a simplified block diagram of an exemplary FRU 300 having a FRUID 95 is shown. As described above, the FRU 300 may represent one of the system control boards 15(1–2), one of the processing boards 30(1–6), one of the input/output (I/O) boards 35(1–4), the power supply 85, the cooling fan, and the like. The FRU 300 includes a plurality of submodules 305. For example, the FRU 300 may be a processing board 30(1–6), and the submodules 305 may be the processors 45, e-caches 50, memory controllers 55, and DIMMs 60. Selected submodules 305 (e.g., the DIMMS 60) may also be themselves field replaceable and have their own FRUIDs 95. The submodules 305 may be organized into groups 310. For example, a processor 45 and its associated e-cache 50, memory controller 55, and DIMMS 60 may be organized into a single group 310.

Figure 4:
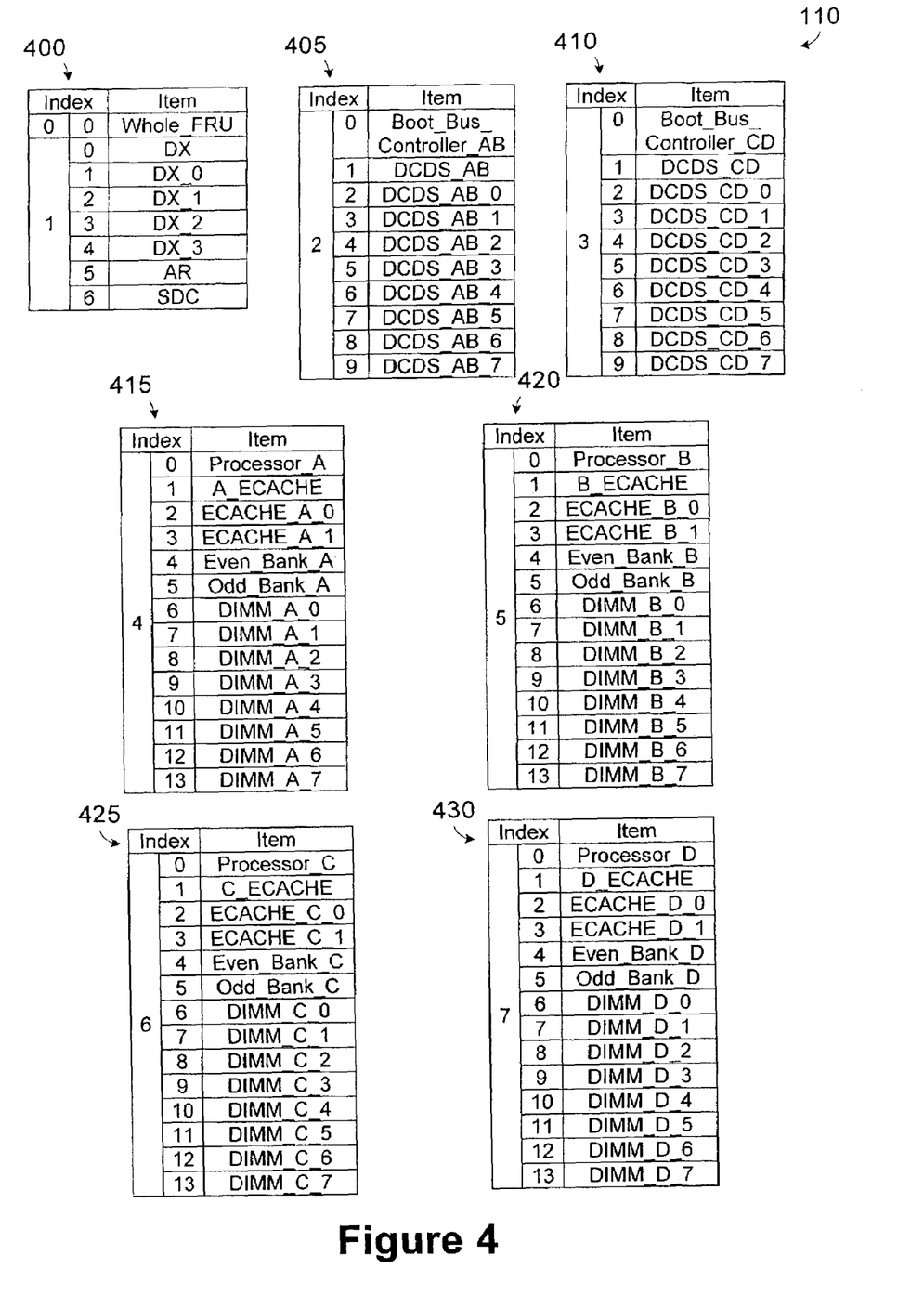
FIG. 4 is a diagram of a component map resident on the FRUID of FIG. 3.

The following example, described with reference to FIG. 4, illustrates the construct of an exemplary component map 100. FIG. 4 illustrates a representation of the content of the component map 100, not the actual data stored in the component map 100. The component map 100 is organized into 7 subgroups 400–430. The subgrouping 400 is related to the data repeaters (DX), address repeaters (AR), and system data controller (SDC—which implements control for the repeaters and a console bus multiplexer). The subgroups 405, 410 are associated with boot bus controllers (not shown) and dual CPU data switches (DCDS) 65. The subgroups 415, 420, 425, 430 are each associated with one of the processors 45 and associated e-caches 50, memory controllers 55, and DIMMs 60. The byte locations, specified by the index fields in the subgroups 400–430 represent the locations of enable bits for each of the components within the component map 100.

In the illustrated embodiment, the component map 100 may be employed to disable defective components in the system 10 and allow for continued operation in a reduced mode of functionality. When a defective component is identified, as described in greater detail below, the component map 100 is accessed to disable the defective component. The disabling of different components may be implemented on different levels. For example, an entire FRU 300 may be disabled (e.g., processor board 30(1–6)), a group 310 of submodules 305 may be disabled (e.g., processor 45 and its associated e-cache 50, memory controller 55, and DIMMS 60), or a single submodule 305 may be disabled (e.g., DIMM 60), depending on the particular fault condition. In another embodiment, the FRU 300 may be disabled by setting a defective error bit 210 (see FIG. 2) in the FRUID 95.

In the illustrated embodiment, the primary responsibility for the collection, interpretation, and subsequent system responsive actions regarding error messages lies with the system controller 20. However, in some embodiments, various other components may perform fault detection functions and report back to the system controller 20. There are various fault conditions that may be identified. The system controller 20 receives error messages from other boards 30(1–6), 35(1–4) and the repeater boards (not shown) (i.e., that implement the data interconnect 40 and address bus 42). Each of these boards drives two copies of any board error messages, one to each system controller board 15(1–2).

The system controller 20 determines the action to take on the errors. Typical actions taken by the system controller 20 (i.e., the boot bus controller (not shown)) may include setting appropriate error status bits, asserting an error pause to stop further address packets, and interrupting the system controller 20. The system controller 20, executing software, reads the various error status registers to find out what happened. After detecting the cause of an error, the system controller 20 may decide whether or not the error is recoverable. If the error is recoverable, the system controller 20 can clear the error status in the appropriate registers in the boards that detected the error. If the error is not recoverable, the system controller 20 may decide to reset the system. Error signals, error pause signals, and/or reset signals can be isolated to each partition and/or domain so that errors in one partition and/or domain do not affect other partitions and/or domains.

There are various types of error conditions that may be detected and analyzed by the system controller 20. In the illustrated embodiment, the DIMMs 60, data interconnect 40, address bus 42, and DCDSs 65 are covered by both parity and error checking and correction (ECC) codes. The entire data path from the processor 45 data pins, through the data buffers, local data switch, and the memory subsystem is protected with ECC. While ECC provides end-to-end data protection, parity is used throughout the system on all interconnects to allow specific detection of any interconnect errors. Parity is regenerated at all interconnects to provide simple and precise fault isolation. In general, error messages propagate from the L1 repeaters and the L2 repeaters to the system controller boards 15(1–2). In some embodiments, the system controller 20 may be configured to use a syslog function to route these messages to an external machine (not shown).

After identifying the errors, the system controller 20 is configured to disable the affected components and reconfigure the system 10 to allow continued operation. Whenever a domain configuration is performed, the system controller 20 checks for any recorded faults and configures the system 10 to exclude failed components. An automatic system recovery unit (ASRU) is the collection of logical parts within the system 10 that have to be removed from a configuration if one of the components develops a fault. Identification of the ASRUs within a configuration allows for evaluation of system redundancy.

When the system 10 fails, the system controller 20 brings the system 10 back up with automatic system reconfiguration. However, an unassisted system reboot will not always be possible. For example, if an I/O board 35(1–4) fails, a boot disk (not shown) or network connection (not shown) may be lost. To address such a situation, a multipathing feature, such as alternate pathing (AP), may be used to extend the usefulness of automatic system reconfiguration. Using AP, each I/O device connects to two I/O boards 35(1–4). If one I/O board 35(1–4) fails, the device can be switched to the alternate I/O board 35(1–4).

In the illustrated embodiment, there are two types of automatic system reconfiguration actions, simple and partial. A simple automatic system reconfiguration involves removing a failed device (e.g., the entire board 30(1–6), 35(1–4)) from the system configuration. For example, if a DC-DC converter fails on one of the processor boards 30(1–6), the entire board 30(1–6) is removed from the domain. A partial automatic system reconfiguration, involves partial reconfiguration of components on a board 30(1–6), 35(1–4). The rest of the board 30(1–6), 35(1–4) can participate in the domain with a low risk of problems resulting from the failed parts. Simple automatic system reconfigurations may be implemented by setting the defective error bit 210 (see FIG. 2) for the affected FRU 300 or by setting the appropriate enable bit(s) in the component map 100.

Typically, the particular component causing an error may be determined. For example, FCC and parity information allow specific defective components to be identified. The nature of the problem determines the degree of isolation required (i.e., simple or partial reconfiguration). For example, if an error occurs in an e-cache 50, the fault may be isolated only by disabling the entire processor 45 and its associated devices. If the error occurred in a DIMM 60, only the affected DIMM 60 need be disabled, and the processor 45 may remain in the domain with reduced memory resources. If the DIMMs 60 are arranged in a bank configuration the other DIMM(s) 60 in the associated bank may also need to be disabled. In such a case, the defective error bit 210 (see FIG. 2) may be set for the defective DIMM 60 and the other DIMM in the bank may be disabled using the component map 100. In such a manner, it is evident which DIMM 60 is defective and which is disabled as part of the reconfiguration.

If a correctable error is detected using ECC, the system controller 20 is notified and enough information is saved to isolate the failure to a single FRU 300 within the system 10. The data containing the error is sent through the system 10 unchanged and the error is reported to the error registers. The system controller 20 is notified for logging purposes that an error has occurred. Intermediate places throughout the system 10 provide ECC detection, but the data is not modified throughout its "flight" within the system 10 until it reaches a processor 45 or an I/O controller 70. The memory subsystem does not check or correct errors, but provides the extra storage bits for the error checking and correcting code. The ECC codes are used to assist in fault isolation. The intermediate level one repeaters (L1) detect, but do not correct, data errors flowing through them. With ECC, it is important to record the first error and whether the first error was detected by an incoming device or an outgoing device. If the error is first seen as incoming to a device, that device will record the presence of the incoming error. If that error is subsequently seen "outgoing", then the error was not caused by the device, but the device is a propagator of the error. The real cause of the error would be the FRU 300 that first recorded the error as an outgoing error, but did not receive the error as an incoming error from the previous device as the data was passing through.

While ECC provides end-to-end data protection, parity is used throughout the system 10 to allow specific detection of any interconnect errors. Parity is regenerated at all interconnects to provide simple and precise fault isolation. Uncorrectable parity errors cause the hardware to pause, to allow software running on the system controller 20 to determine the error status. This is achieved by stopping any further transactions on the address queue. Outstanding addresses in the queue will be completed, but no new addresses will be forwarded. The system controller 20 will perform diagnostics and log the failure information before the operating system faults.

Figure 5:
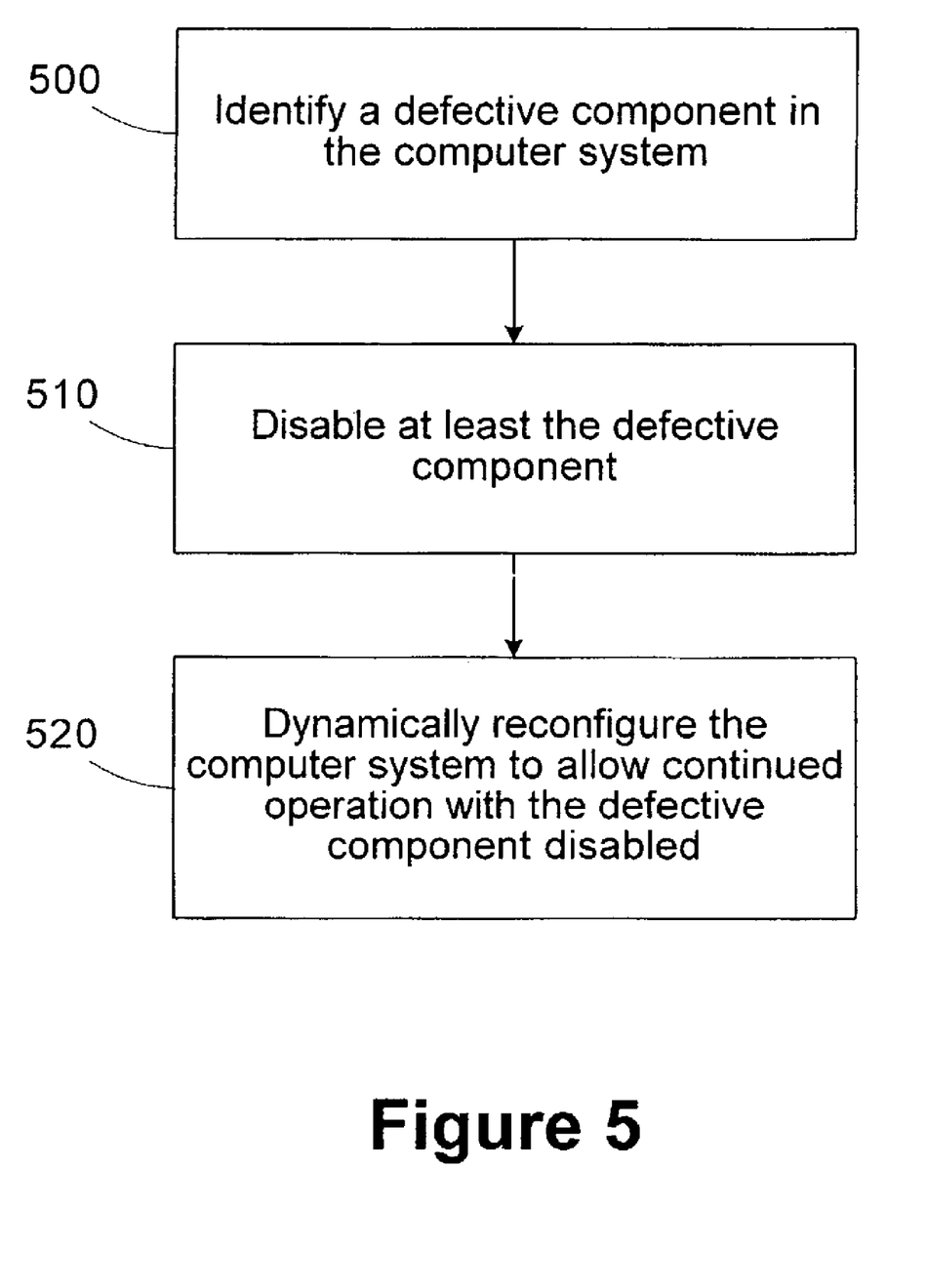
FIG. 5 is a simplified flow diagram of a method for disabling defective components in a computer system in accordance with another embodiment of the present invention.

Turning now to FIG. 5, a simplified flow diagram of a method for disabling defective components in a computer system in accordance with another embodiment of the present invention is provided. In block 500, a defective component in the computer system is identified. For example, an ECC or parity error may be used to identify a defective memory device. In block 510, at least the defective component is disabled. Exemplary techniques for disabling the defective component described above include setting a defective error bit in the device or by disabling the defective device in a component map maintained by the system. In block 520, the computer system is dynamically reconfigured to allow continued operation with the defective component disabled. If the defective device is on a common board with other devices, only the defective device may be disabled. In another embodiment, the entire board may be disabled. The defective device may also have associated devices, which are also disabled.

Identification and isolation of defective components, as described above, allows the system 10 to remain operational in a reduced capacity configuration until defective components can be replaced. Allowing the system 10 to continue operating eliminates expensive downtime and potential customer interruptions. The particular identity of the defective components may be determined using the component map 100 and the error information stored in the FRUID 95. After repair, the system 10 may be dynamically reconfigured to restore full capability.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for configuring a computer system, wherein the computer system includes a field replaceable unit comprising a plurality of components including a defective component, and wherein the field replaceable unit comprises a first field replaceable unit, and the defective component comprises a second field replaceable unit having an associated field replaceable unit identification memory configured to store error information associated with the second field replaceable unit, the method comprising:

identifying the defective component in the computer system;

disabling at least the defective component;

dynamically reconfiguring the computer system to allow continued operation with the defective component disabled;

allowing continued operation of at least a portion of the plurality of components of the field replaceable unit other than the defective component;

generating a component map of the components in the first field replaceable unit, the component map including enable information regarding the components;

accessing the component map to disable a subset of components associated with the defective component; and accessing the error information in the associated field replaceable unit identification memory to set a defective error bit to disable the second field replaceable unit.

2. The method of claim 1, wherein the plurality of components comprises at least a processor and an associated memory device, and the method further comprises:

disabling the processor responsive to the memory device being the defective component; and disabling the memory device responsive to the processor being the defective component.

3. The method of claim 1, wherein the plurality of components comprises a processor and a plurality of associated memory devices, the defective component comprising a defective memory device from the plurality of associated memory devices, and the method further comprises:

disabling the defective memory device; and enabling the processor and the memory devices in the plurality of associated memory devices other than the defective memory device.

4. The method of claim 3, wherein the memory devices are arranged in banks, and the method further comprises disabling one of the plurality of associated memory devices in a common bank with the defective memory device.

5. A method for configuring a computer system that includes a field replaceable unit comprising a plurality of components including a defective component, and wherein the plurality of components comprises a processor and a plurality of associated memory devices, and the defective component comprises a defective memory device from the plurality of associated memory devices, and wherein the field replaceable unit comprises a first field replaceable unit, and the defective memory device comprises a second field replaceable unit having an associated field replaceable unit identification memory configured to store error information associated with the second field replaceable unit, the method comprising:

identifying the defective component in the computer system;

disabling the defective memory device;

dynamically reconfiguring the computer system to allow continued operation with the defective component disabled;

allowing continued operation of at least a portion of the plurality of components of the field replaceable unit other than the defective component;

enabling the processor and the memory devices in the plurality of associated memory devices other than the defective memory device;

generating a component map of the components in the first field replaceable unit, the component map including enable information regarding the components;

accessing the component map to disable one of the plurality of associated memory devices in a common bank with the defective memory device; and accessing the error information in the associated field replaceable unit identification memory to set a defective error bit to disable the defective memory device.

6. A computer system, comprising:

a field replaceable unit comprising a plurality of components; and a system controller adapted to identify a defective component from the plurality of components and to dynamically reconfigure the computer system to allow continued operation with the defective component disabled, and wherein the system controller is further configured to allow continued operation of at least a portion of the plurality of components of the field replaceable unit other than the defective component, wherein the field replaceable unit comprises a first field replaceable unit, and the defective component comprises a second field replaceable unit having an associated field replaceable unit identification memory configured to store error information associated with the second field replaceable unit, and the system controller is further configured to generate a component map including enable information regarding the components in the first field replaceable unit, to access the component map to disable a subset of the plurality of components associated with the defective component, to and access the error information in the associated field replaceable unit identification memory to set a defective error bit to disable the second field replaceable unit.

7. The system of claim 6, wherein the plurality of components comprises at least a processor and an associated memory device, and the system controller is further configured to disable the processor responsive to the memory device being the defective component and disable the memory device responsive to the processor being the defective component.

8. The system of claim 6, wherein the plurality of components comprises a processor and a plurality of associated memory devices, the defective component comprising a defective memory device from the plurality of associated memory devices, and the system controller is further configured to disable the defective memory device and enable the processor and the memory devices in the plurality of associated memory devices other than the defective memory device.

9. The system of claim 8, wherein the memory devices are arranged in banks, and the system controller is further configured to disable one of the plurality of associated memory devices in a common bank with the defective memory device.

10. The system of claim 8, wherein the field replaceable unit comprises a third field replaceable unit and the defective memory device comprises a fourth field replaceable unit having an associated field replaceable unit identification memory configured to store error information associated with the fourth field replaceable unit, and the system controller is further configured to generate a component map of the components in the third field replaceable unit, the component map including enable information regarding the plurality of components, access the component map to disable the one of the plurality of associated memory devices in a common bank with the defective memory device, and access the error information in the associated field replaceable unit identification memory to set a defective error bit to disable the defective memory device.

* * * * *